UNITED STATES PATENT OFFICE.

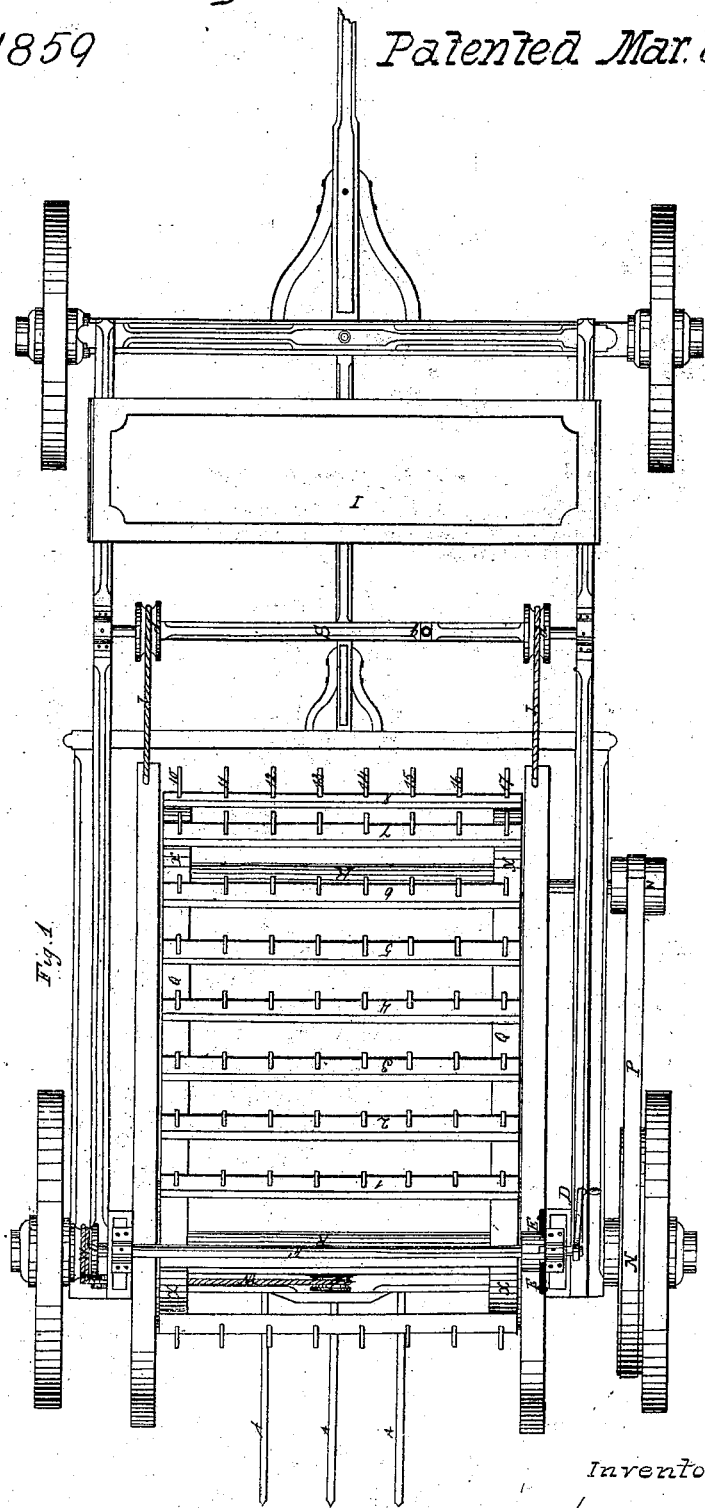

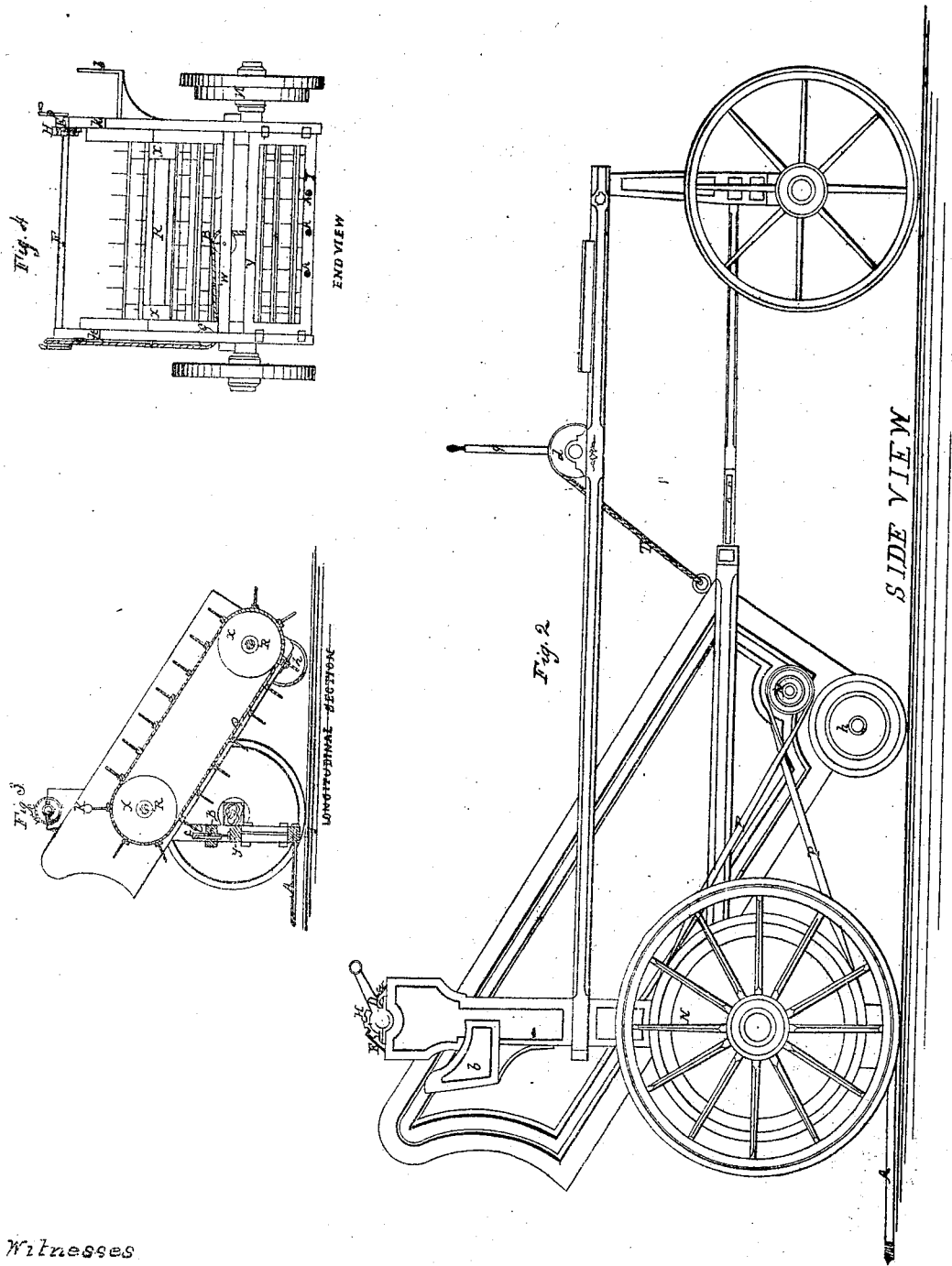

NATHANIEL W. PLYMATE, OF FREELAND, IOWA.

IMPROVEMENT IN HAY-SHOCKING MACHINES.

Specification forming part of Letters Patent No. 41,859, dated March 8, 1864.

*To all whom it may concern:*

Be it known that I, NATHANIEL W. PLYMATE, of Freeland, in the county of Lucas, in the State of Iowa, have invented a new and useful Improvement on Machines for Raking and Shocking Hay; and I do hereby declare that the following is a full, clear, and exact description of the construction and operation of the same, reference being had to the annexed drawings, making a part of this specification, and to the letters of reference marked thereon, in which—

Figure 1, Sheet 1, is a top view. Fig. 2, Sheet 2, is a side view; Fig. 3, a longitudinal section, and Fig. 4, an end view.

The nature of my invention consists in combining a rotary rake attached to a wagon, which gathers the hay and carries it on an elevation to the rear end of the machine, when it is dropped, with an apron constructed of long teeth or pins fastened to a sash, which is raised and lowered at will by means of a rope and windlass attached to the rear standards, thus shocking the hay as fast as raked without stoppage, and keeping it untangled and unwadded, greatly facilitating the labor of pitching and harvesting in general.

To enable others skilled in the art to make and use my invention, I will proceed to describe its construction and operation.

I use four wheels—those of an ordinary wagon may be used—which are placed upon axle-trees in the ordinary way. The front axle-tree is provided with a "sand-board" and "bolster," with "standards" attached to it. The axle-trees are made the length suited to a machine of the desired size. Two upright pieces or posts are bolted to the back side of the rear axle-tree. A board or frame on each side of the wagon is adjusted, with the rear end kept in place by means of a pin or bolt, *k k*, through the uprights and above the axle-tree. The other end of these boards or frames rest on small wheels *h* immediately in rear of the front wheels of the wagon or machine, thus giving these boards or frame an angling position by elevating the rear end.

At each end of these boards there is a shaft, R R, upon which are drums *x x x x*, around which are belts Q Q, upon which bars 1 2 3 4 5 6 are attached, and in said bars are pins 10 11 12 13 14 15 16 17, of wood or iron. This belt is made to move by means of a rim, N, attached to one of the rear wheels, which may be done by attaching segments by means of strips or bolts to the spoke of the wheels, a band or belt, P, working on it, and a drum, N, on the front shaft on the outside of the board or frame. Then, as the wagon or machine moves, this belt or endless chain is made to move, and the teeth in the bars rake or gather the hay, which is carried backward and to an elevated position, and is thrown upon long teeth or bars at the rear end of the wagon or machine, where the shock is formed. These teeth or bars A A A are fastened to and adjusted from a frame, Y Y, which works between the uprights or posts. This frame is raised or lowered by means of a cord, W, passing around a pulley, B, in a cross-bar just above the axle-tree; thence around another pulley, C, in the upright on the "near side;" thence around a drum, O, on a shaft, F, passing through or adjusted to the top of the uprights; and on the "off-side" upright is a seat, *b*, for the purpose of a person sitting on, who, by means of a crank, D, on the end of this shaft, raises or lowers this frame at will. Thus when the machine is in motion these teeth rake or gather up the hay and carry it up and back and throw it on the projecting bars behind, which should be long enough to hold a shock of hay. The person on this seat with a light pitchfork forms the shock as the hay is deposited. When the shock is finished he, by means of the crank, lowers the frame and the shock is left on the ground, when the frame is again raised and ready for the formation of another shock. The distance that the teeth which gather the hay run from the ground is regulated by the small wheels, upon which the front end of these boards or frame rest, which wheels are arranged so that their axis or bearing can be raised or lowered.

To raise the teeth over sudden obstructions or inequality in the surface of the ground, or in moving the machine when not raking and shocking, there is a bar attached to each of the uprights, and extending forward and fastened to the standards on the front axle-tree, upon which is placed a driver's seat, I, and in the rear of which is a shaft, S, these bars serving as bearings for it, and on each end of this shaft is a drum, *d d*, and to which drum there is a cord, T T, attached, which is fastened to the front end of the boards or frame. A lever, g, is fastened to this shaft. The driver, by pulling this lever forward, thus winding these cords around the drum, raises the front end of these boards or frame, and thus raises the teeth. The coupling of this wagon or machine is constructed by using two "coupling-poles," which are attached to the rear axle-tree near the wheels, extending forward to near the front wheels. A cross-bar is framed to or fastened to the ends of them, and in the center of this cross-bar is fastened a "reach" or coupling, which is attached to the front axle-tree in the ordinary way.

To keep the frame Y Y, to which is attached the teeth or bars A A A, in a proper position while the shock is being made, there is a rag-wheel, H, on the shaft F, with a latch, E, which is raised from or dropped in the rag-wheel at will.

What I claim as my invention, and desire to secure by Letters Patent of the United States, is—

The shock-frame constructed of the frame or sash Y Y and teeth or bars A A A, when combined with the rotating rake, and used in the manner and for the purpose herein set forth.

NATHANIEL W. PLYMATE.

Witnesses:
DAVID MERCER,
E. JACKSON.